(12) United States Patent
Anandan

(10) Patent No.: US 8,395,865 B2
(45) Date of Patent: Mar. 12, 2013

(54) THERMALLY INSULATED SUSPENSION LOAD BEAM

(75) Inventor: Krishna Prashanth Anandan, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 1866 days.

(21) Appl. No.: 11/328,556

(22) Filed: Jan. 10, 2006

(65) Prior Publication Data

US 2007/0159725 A1 Jul. 12, 2007

(51) Int. Cl.
*G11B 21/21* (2006.01)

(52) U.S. Cl. .................................... 360/244.3

(58) Field of Classification Search ............... 360/244.3, 360/244.5, 244.8, 244.9, 245
See application file for complete search history.

(56) References Cited

U.S. PATENT DOCUMENTS

| | | | |
|---|---|---|---|
| 3,930,085 A | | 12/1975 | Pasiuk |
| 4,055,705 A | | 10/1977 | Stecura et al. |
| 4,485,151 A | | 11/1984 | Stecura |
| 4,535,033 A | | 8/1985 | Stecura |
| 4,935,086 A | * | 6/1990 | Baker et al. .................. 156/246 |
| 4,996,623 A | | 2/1991 | Erpelding et al. |
| 5,427,848 A | | 6/1995 | Baer et al. |
| 5,761,184 A | * | 6/1998 | Dauber et al. ................ 720/694 |
| 5,771,137 A | | 6/1998 | Nagase |
| 5,774,305 A | | 6/1998 | Boutaghou |
| 5,936,806 A | | 8/1999 | Pan et al. |
| 6,018,437 A | | 1/2000 | Weichelt et al. |
| 6,356,414 B1 | | 3/2002 | Traskos et al. |
| 6,539,609 B2 | | 4/2003 | Palmer et al. |
| 6,600,633 B2 | * | 7/2003 | Macpherson et al. ..... 360/265.8 |
| 6,775,088 B2 | | 8/2004 | Toffle et al. |
| 6,785,082 B2 | | 8/2004 | Fiorvanti et al. |
| 6,785,094 B2 | | 8/2004 | Arya et al. |
| 6,900,968 B2 | | 5/2005 | Buske et al. |
| 6,912,098 B2 | | 6/2005 | Wang et al. |
| 6,952,330 B1 | | 10/2005 | Riddering et al. |
| 6,965,499 B1 | | 11/2005 | Zhang et al. |
| 7,304,823 B2 | * | 12/2007 | Suzuki ....................... 360/244.3 |

(Continued)

FOREIGN PATENT DOCUMENTS

| JP | 54058004 A | * | 5/1979 |
|---|---|---|---|
| JP | 59104760 A | * | 6/1984 |

(Continued)

OTHER PUBLICATIONS

English-machine translation of Suzuki (WO 2004/040571 A1), published on May 13, 2004.*

(Continued)

*Primary Examiner* — Will J Klimowicz
(74) *Attorney, Agent, or Firm* — Mitchell K. McCarthy; McCarthy Law Group

(57) ABSTRACT

A suspension load beam for use in supporting a transducer head in a data storage system includes a front beam section, a rear beam section, and a middle beam section. The front beam section is configured to connect to a slider assembly carrying a transducer head. The rear beam section is configured to connect to an actuator arm. The middle beam section is located between the front beam section and the rear beam section. The middle beam section comprises a top thermal insulation layer, a bottom thermal insulation layer and a rigid layer between the top and bottom thermal insulation layers.

9 Claims, 6 Drawing Sheets

U.S. PATENT DOCUMENTS

| | | | |
|---|---|---|---|
| 2002/0080527 A1* | 6/2002 | Shiraishi | 360/244.3 |
| 2002/0181155 A1* | 12/2002 | Takagi et al. | 360/244.3 |
| 2003/0007289 A1* | 1/2003 | Shiraishi | 360/244.3 |
| 2004/0228037 A1* | 11/2004 | Wada et al. | 360/244.3 |
| 2004/0264055 A1 | 12/2004 | Wright | |
| 2005/0122626 A1* | 6/2005 | Suzuki | 360/244.9 |

FOREIGN PATENT DOCUMENTS

| | | | |
|---|---|---|---|
| JP | 62028973 A * | 2/1987 | |
| JP | 02058778 A * | 2/1990 | |
| JP | 08249849 A * | 9/1996 | |
| JP | 11185415 A * | 7/1999 | |
| WO | WO 2004040571 A1 * | 5/2004 | |

OTHER PUBLICATIONS

English-machine translation of JP 08-249849 A to Sato, published on Sep. 27, 1996.*

* cited by examiner

THERMALLY INSULATED SUSPENSION LOAD BEAM

BACKGROUND

The present invention relates to a suspension load beam configured to carry a transducer head. More particularly, the present invention relates to a suspension load beam having thermal insulation layers that reduce structural distortion of the suspension load beam in response to environmental temperature changes.

Disc drives are data storage devices that store digital data in magnetic form on a rotating disc. Modern disc drives comprise one or more rigid information storage discs that are coated with a magnetizable medium and mounted on the hub of a spindle motor for rotation. Data is read from and written to a plurality of concentric circular tracks on the discs by transducer heads ("read/write heads") that are carried by sliders placed in close proximity to the disc surfaces. Each slider is attached through a gimbal system to a distal end of a suspension load beam. The proximal end of the suspension load beam is attached to an actuator arm that rotates to move the slider to a desired position relative to the associated disc surface.

During a write operation sequential data is written onto the disc track, and during a read operation the head senses the data previously written onto the disc track and transfers the information to an external environment. Important to both of these operations is the accurate and efficient positioning of the head relative to the center of the desired track on the disc (i.e., track following).

Head positioning within a desired track is dependent on head-positioning servo patterns, which are patterns of data bits recorded on the disc surface that are used to maintain optimum track spacing and sector timing. The servo patterns or information can be located between the data sectors on each track of a disc ("embedded servo"), or on only one surface of one of the discs within the disc drive ("dedicated servo").

The servo patterns are typically recorded on the magnetizable medium of a target disc by a servo-track writer ("STW") assembly during the manufacture of the disc drive. One type of STW assembly records servo pattern on the discs following assembly of the disc drive. The STW assembly attaches directly to a disc drive having a disc pack where the mounted discs on the disc pack have not been pre-recorded with servo pattern. The STW essentially uses the drive's own read/write heads to record the requisite servo pattern directly to the mounted discs. An alternative method for servo pattern recording utilizes a separate STW assembly having dedicated servo recording transducers or heads for recording servo pattern onto one or more discs. The dedicated servo recording heads can be used to record servo information to a number of discs simultaneously, which are subsequently loaded into the disc drive for use.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per inch). Increased track density requires more closely-spaced, narrow tracks and therefore enhanced accuracy in the recording of the servo-patterns onto the target disc surface.

Thermal distortion of the suspension load beam can contribute to errors in the positioning of the servo-patterns relative to the target disc. The principle of thermal expansion states that essentially all solids expand in volume when the temperature is raised. When the temperature is increased, the average distance between atoms increases, which leads to an expansion of the whole solid body.

During disc drive or STW operation, temperature gradients in the suspension load beam continuously change over time. These changes are due in part to varying wind currents around the suspension load beam and the varying heat contributions of components of the device. The resultant thermal distortions to the structure of the suspension load beam cause the position of the transducer head to deviate from the desired position, which affects the accuracy at which the servo-patterns can be written. As a result, such thermal distortions can limit the track density of the recording medium and can introduce undesirable repeatable runout that must be compensated for by the disc drive during track following (e.g., data read and write operations).

Embodiments of the present invention provide solutions to these and other problems, and offer other advantages.

SUMMARY

The present invention generally relates to a suspension load beam for use in supporting a transducer head in a data storage system. In one embodiment, the suspension load beam includes a front beam section, a rear beam section, and a middle beam section. The front beam section is configured to connect to a slider assembly carrying a transducer head. The rear beam section is configured to connect to an actuator arm. The middle beam section is located between the front beam section and the rear beam section. The middle beam section comprises a top thermal insulation layer, a bottom thermal insulation layer and a rigid layer between the top and bottom thermal insulation layers.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
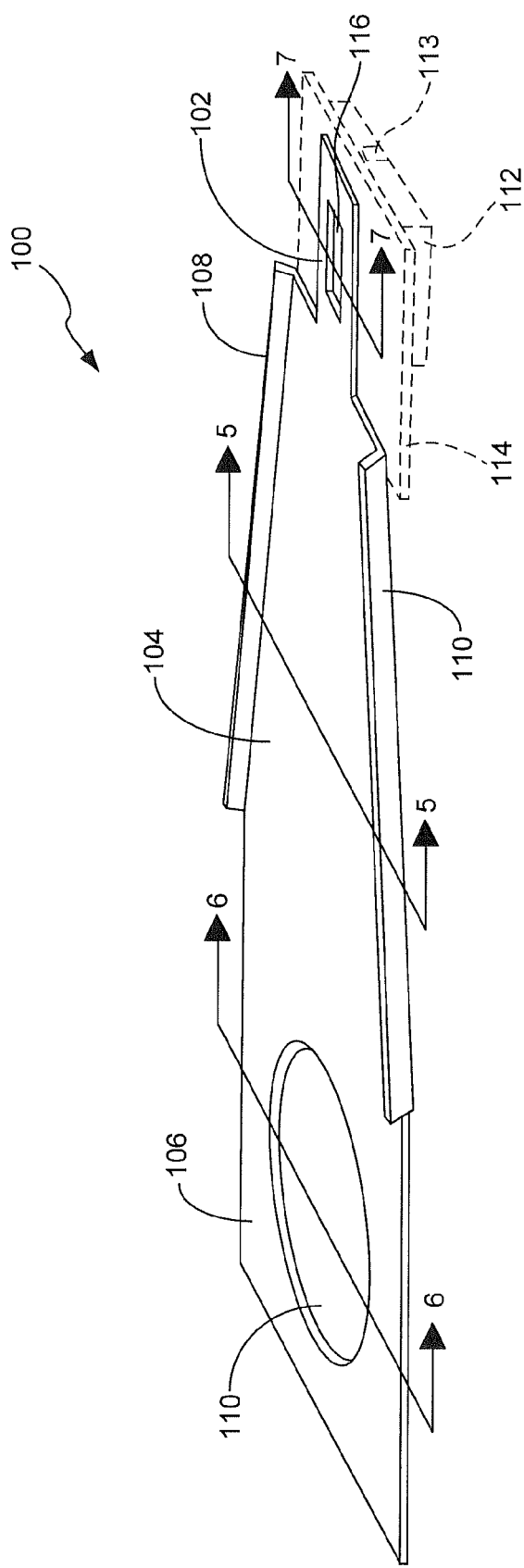
FIG. 1 is a perspective view of a suspension load beam in accordance with embodiments of the invention with a gimbal and slider assembly depicted in phantom.

FIG. 1 is a perspective view of a suspension load beam 100 in accordance with embodiments of the invention. Suspension load beam 100 includes a front beam section 102, a middle beam section 104, and a rear beam section 106. On middle beam section 104 are a pair of side rails 108 that operate to stiffen that section. On rear beam section 106 is mounting hole 110 for attaching suspension load beam 100 to an actuator arm of a disc drive or a servo-track writer (STW) using a swaging mechanism or other suitable technique. The front beam section 102 is configured to receive a slider assembly 112, commonly through a gimbal mechanism 114, which are shown in phantom since they are not essential to the present invention. The slider assembly 112 carries a transducer head 113 for reading and/or writing data to a recording medium, such as a magnetic disc. Furthermore, the structural appearance of the suspension load beam 100, such as opening 116 in the front beam section 102, the side rails 108 and the mounting hole 110 are nonessential for the present invention and can vary in order to accommodate the particular use of the suspension load beam.

Figure 2:
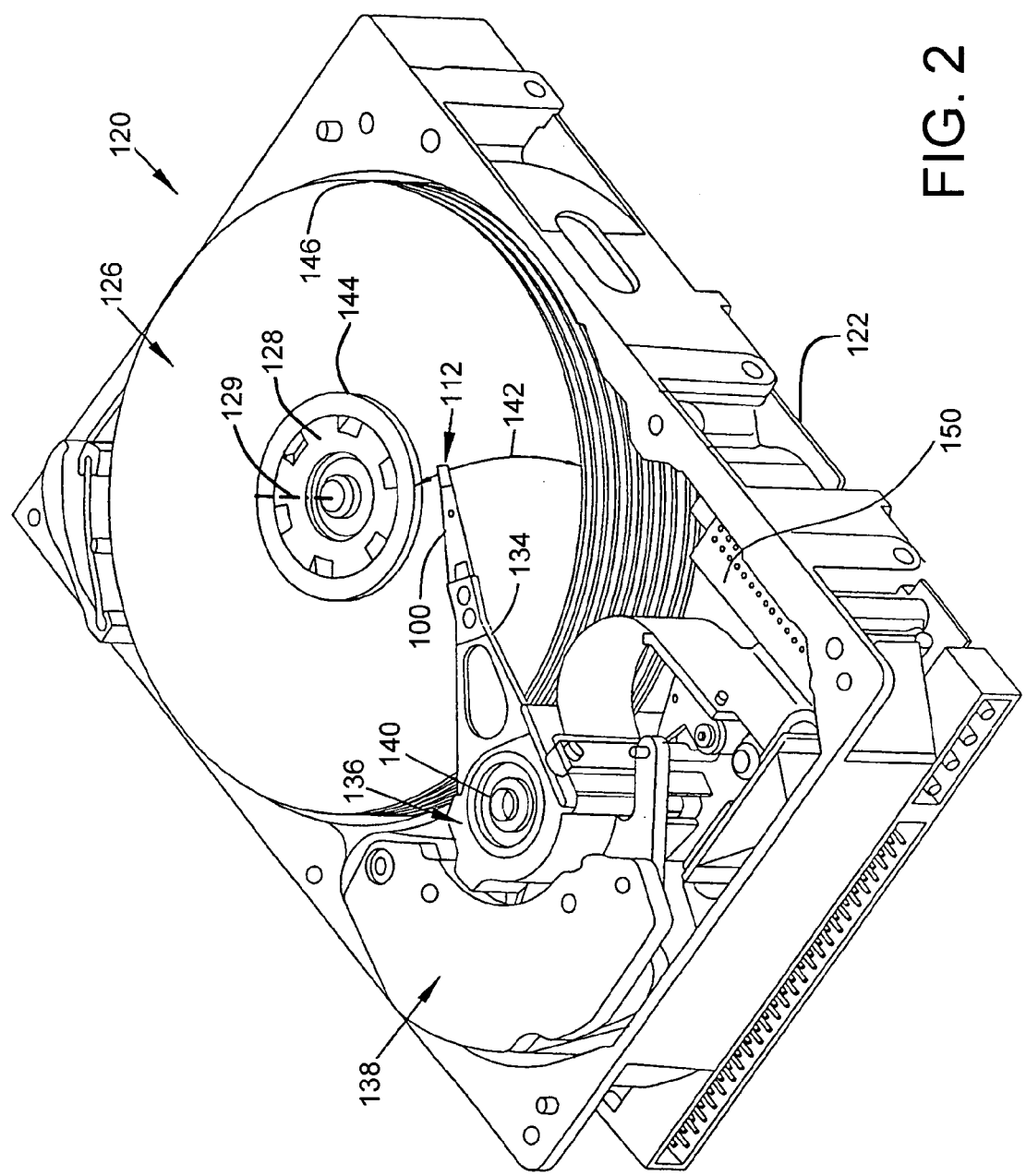
FIG. 2 is an isometric view of a disc drive.

FIG. 2 is an isometric view of a disc drive 120 in which embodiments of the suspension load beam 100 are useful. Disc drive 120 includes a housing with a base 122 and a top cover (not shown). Disc drive 120 further includes a disc pack 126, which is mounted on a spindle motor (not shown) by a disc clamp 128. Disc pack 126 includes a plurality of individual discs, which are mounted for co-rotation about central axis 129. Each disc surface has an associated transducer head or disc head slider assembly 112 which are attached to a front beam section 102 of a suspension load beam 100 of the present invention for communication with the disc surface. Rear beam sections 106 of the suspension load beams 100 are attached to actuator arms 134 of an actuator assembly 136. The exemplary actuator assembly 136 shown in FIG. 1 is of the type known as a rotary moving coil actuator and includes a voice coil motor, shown generally at 138. Voice coil motor 138 rotates actuator arms 134 and the attached suspension load beams and slider assemblies 112 about a pivot shaft 140 to position heads 112 over a desired data track along an arcuate path 142 between a disc inner diameter 144 and a disc outer diameter 146. Voice coil motor 138 is driven by servo electronics 150 based on signals generated by heads 113 and a host computer (not shown).

Figure 3:
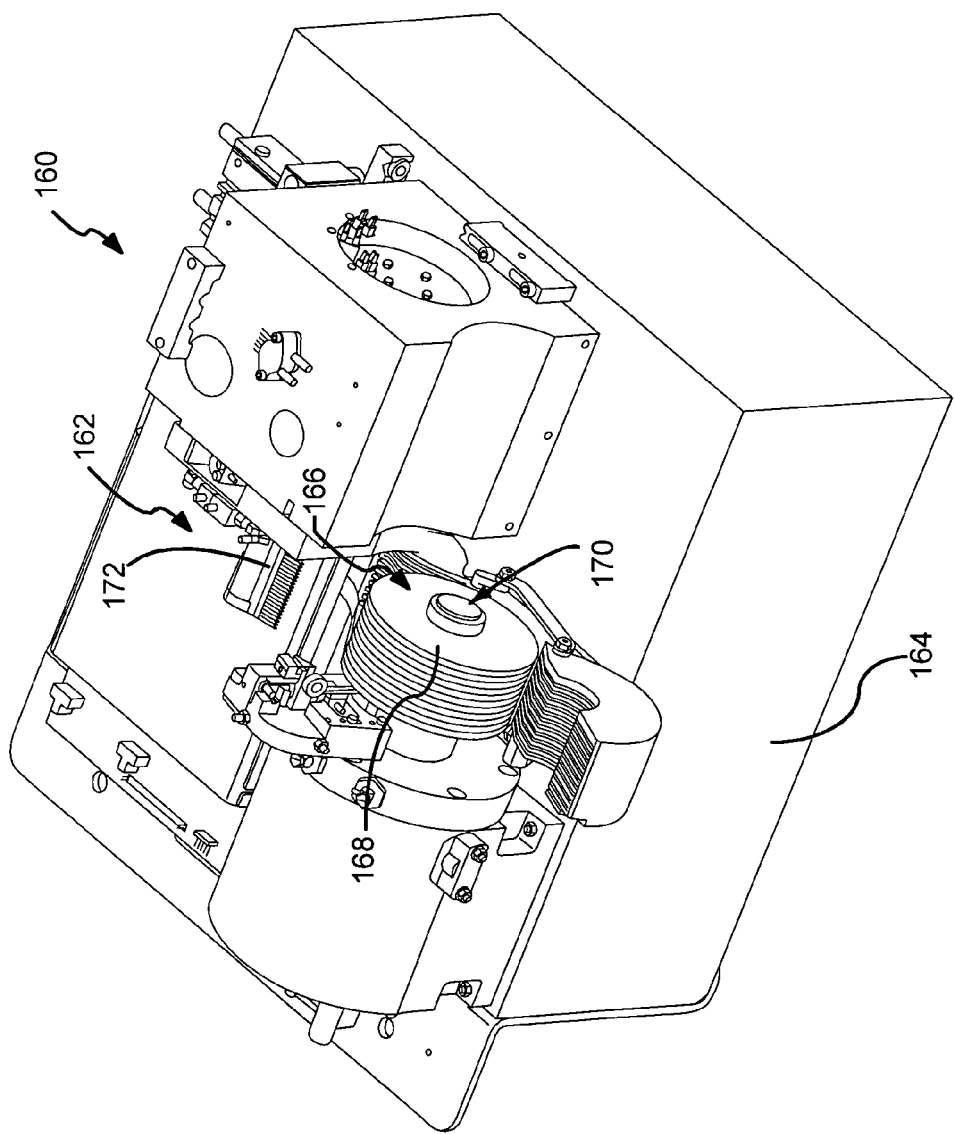
FIG. 3 is a perspective view of an exemplary multi-disc servo-track writer.
Figure 4:
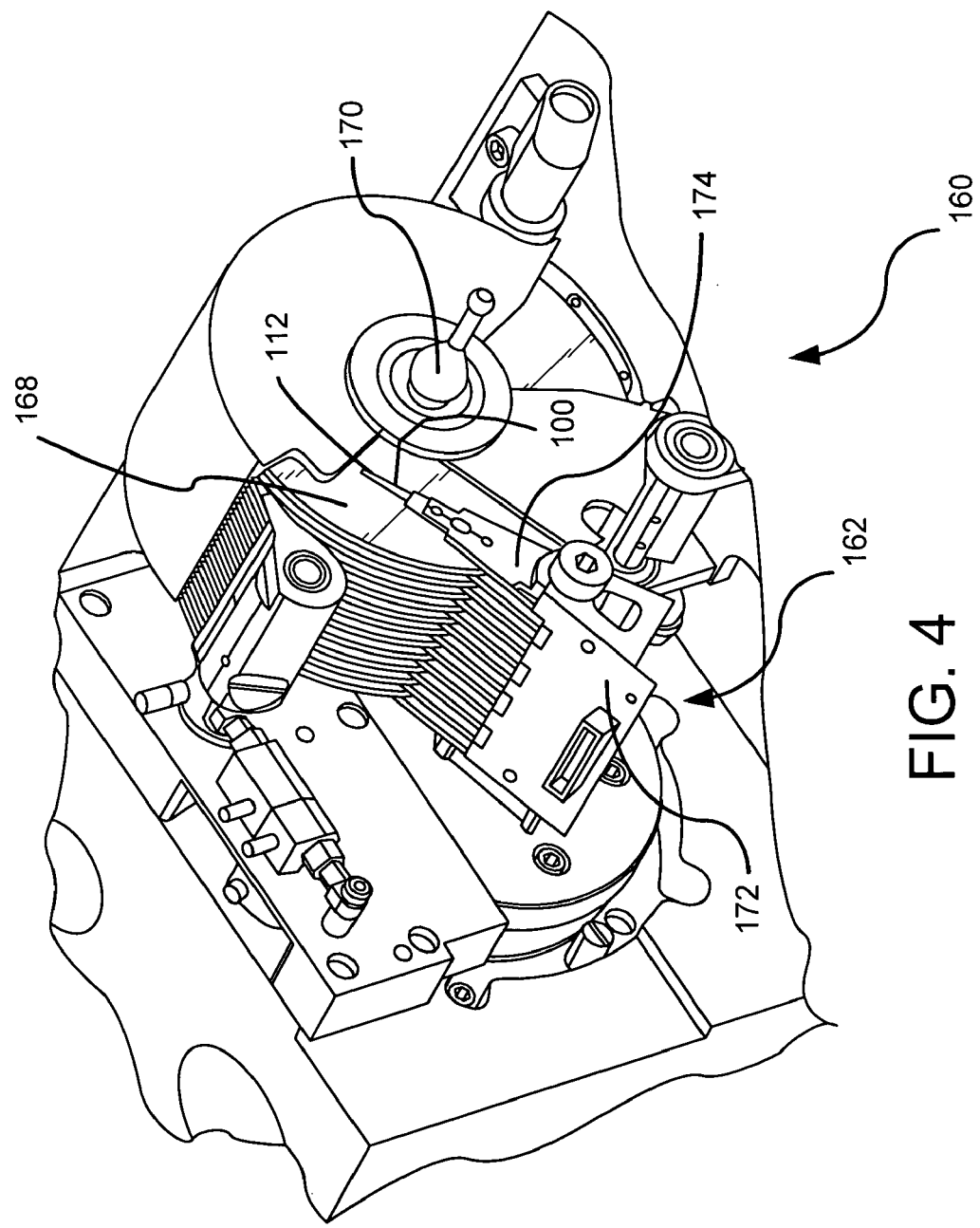
FIG. 4 is a perspective view of an actuator assembly of the servo-track writer of FIG. 3.

FIG. 3 is a perspective view of an exemplary dedicated multi-disc servo track writer ("STW") 160 in which embodiments of the suspension load beam 100 are useful. FIG. 4 is a perspective view of an actuator assembly 162 of the STW 160. The STW 160 sits upon a substantially immobile and horizontally positioned platform or base 164. A disc pack 166 includes a plurality of target discs 168 onto which a servo pattern is to be recorded. The discs 168 are mounted for co-rotation about a spindle motor hub 170. The actuator assembly 162 (FIG. 4) is connected to the platform 164 via a slide mechanism for lateral movement over the platform 164. The actuator assembly 162 includes an E-block 172 having a plurality of actuator arms 174. A distal end of each actuator arm 174 attaches to the rear beam section 106 of a suspension load beam 100. Transducer heads or servo-writing heads 113 are carried by slider assemblies 112 attached to the front beam section 102 of the suspension load beams 100.

The environmental temperature within the disc drive 120 or STW 160 constantly changes during operation. The changing temperature is due, in part, to the many heat generating components of the disc drive 120 or STW 160, such as, for example, preamplifiers, the spindle hub, etc. The generated heat is transferred to the suspension load beam 100 through conduction, such as through the connected actuator arm (134, 174), and convection.

The continuously changing environmental temperature that suspension load beam 100 of disc drives and STW's are subjected to produce time-varying temperature gradients in the suspension load beams. The changes in the temperature gradients within the suspension load beams lead to non-uniform expansion and contraction of the structures. As a result, the suspension load beams undergo structural distortions during operation that results in a change in the position and/or orientation of the front beam sections and, thus, the supported transducer heads, even when the actuator arms are held in a fixed position.

During servo-pattern writing operations, the precise position of the heads of the disc drive or the STW is unknown. As a result, an estimate of the position of the heads must be made using conventional techniques, such as with a laser interferometer, that detects a position of the actuator arms to which the heads are attached through suspension load beams. Although conventional head positioning techniques are highly accurate, they cannot take into account the low frequency head movement caused by the thermal distortion of the suspension load beams. Accordingly, such thermally induced movement of the transducer head affects the accuracy at which servo-patterns can be written and, thus, limits the track density of the recording disc. Additionally, the thermally induced motion of the transducer head also produces non-repeatable runout that must be compensated for by the servo electronics of the disc drive in order to follow a desired track during a data reading or writing operation.

The suspension load beam 100 of the present invention is useful in improving the accuracy of the positioning of the transducer heads 113 during use in disc drives 120 or STW's 160 by reducing the sensitivity of the suspension load beam 100 to environmental temperature changes. In particular, the suspension load beam 100 is thermally isolated from the temperature fluctuations of the operating environment to thereby reduce the fluctuations in the temperature gradients within the suspension load beam 100. As a result, the suspension load beam 100 has a lower sensitivity to temperature fluctuations, which reduces thermally induced low frequency movement of the attached transducer head 113 and leads to more accurate head positioning.

One measure of a structure's sensitivity to distortion from changing environmental temperatures is the thermal time constant. In general, the lower the thermal time constant, the faster the beam responds to environmental temperature changes.

The thermal time constant of a rectangular beam formed of a single material and having similar dimensions as the suspension load beam of FIG. 1, can be approximated in accordance with Eq. 1. In Eq. 1, $\rho$=Density, $C_P$=Specific Heat Capacity and V=Volume of the beam and $A_s$=Heat transfer surface area.

$$\text{Thermal time-constant}(\tau) = \frac{\rho C_p V}{h A_s} \quad \text{Eq. 1}$$

Figure 5:
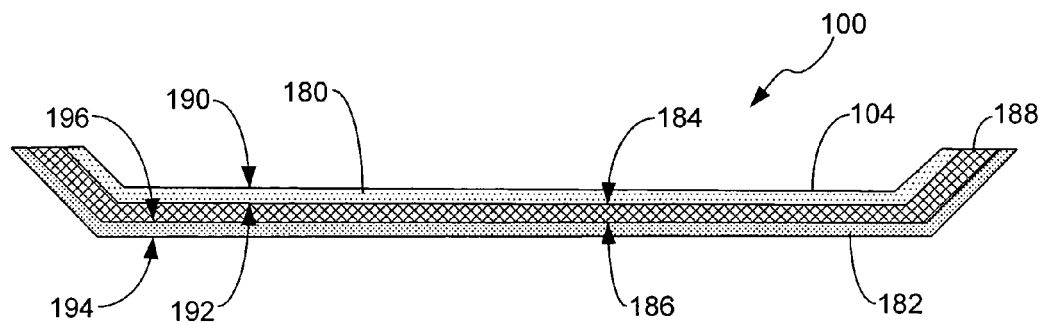
FIG. 5 is a cross-sectional view of a middle beam section of the suspension load beam of FIG. 1 taken generally along line 5-5.

Embodiments of the suspension load beam 100 include top and bottom thermal insulation layers 180 and 182 respectively on top and bottom sides 184 and 186 of a rigid layer 188, as illustrated in the cross-sectional view of FIG. 5 taken along line 5-5 of FIG. 1. The thermal insulation layer 180 includes an exposed top surface 190 and a bottom surface 192 that is bonded to the top surface 184 of the rigid layer 188. The thermal insulation layer 182 includes an exposed bottom surface 194 and a top surface 196 that is bonded to the bottom surface 186 of the rigid layer 188.

The thermal insulation layers 180 and 182 of the beam 100 of the present invention operate to raise the thermal time constant of the suspension load beam 100 and reduce its sensitivity to temperature fluctuations in the operating environment, as compared to a suspension load beam formed solely from the rigid layer 188 (i.e., lacking the thermal insulation layers). The effective time-constant ($\tau_{eff}$) of the suspension load beam 100 of the present invention (FIG. 1) that includes a unitary rigid layer 188 that forms the front beam section 102, the middle beam section 104 and the rear beam section 106, and thermal insulation layers 180 and 182 that substantially cover the top and bottom surfaces 184 and 186 of the rigid layer 188, can be approximated by Eq. 2.

$$\tau_{eff} = \frac{\rho_{eff} C_{peff} V_{tot}}{h A_s},$$ Eq. 2 where:

$$\rho_{eff} = \frac{\rho_1 t_1 + \rho_2 t_2 + \rho_3 t_3}{t_1 + t_2 + t_3} \rho$$

$$C_{P_{eff}} = \frac{\rho_1 C_{p1} t_1 + \rho_2 C_{p2} t_2 + \rho_3 C_{p3} t_3}{\rho_1 t_1 + \rho_2 t_2 + \rho_3 t_3}$$

$$V_{tot} = \frac{A_s}{2}(t_1 + t_2 + t_3)$$

In Eq. 2, $t_1$ is the thickness of the rigid layer 188, $t_2$ is the thickness of the thermal insulation layer 180, $t_3$ is the thickness of the thermal insulation layer 182, $\rho_1$ is the density of the rigid layer 188, $\rho_2$ is the density of the thermal insulation layer 180, $\rho_3$ is the density of the thermal insulation layer 182, $C_{p1}$ is the specific heat capacity of the rigid layer 188, $C_{p2}$ is the specific heat capacity of the thermal insulation layer 180, $C_{p3}$ is the specific heat capacity of the thermal insulation layer 182, $V_{tot}$ is the total volume of the suspension load beam 100 and $A_s$ is the heat transfer surface area of the load beam 100.

Suspension load beams formed solely from a stainless steel rigid layer 188 (i.e., lacking the thermal insulation layers 180 and 182) are highly susceptible to thermally induced structural distortion caused by fluctuating temperature gradients within the structure due to a low thermal time constant. For example, the time constant for the suspension load beam of FIG. 1 formed solely of the stainless steel rigid layer having a thickness of 2.4 mils, a density ($\rho$) of 7800 kg/m$^3$ and a specific heat capacity (C) of 500 J/(kgK), is approximately 0.475 seconds.

However, when the above suspension load beam formed solely of the stainless steel rigid layer 188 is sandwiched between thermal insulation layers 180 and 182 in accordance with embodiments of the invention, the effective time constant can be increased significantly. This is demonstrated in Table 1, which provides a comparison between exemplary suspension load beams of the present invention having insulation layers 180 and 182 formed from various materials. The exemplary load beam 100 includes a unitary rigid layer 188 of stainless steel that forms the rear beam section 106, the middle beam section 104 and the front beam section 102, and has a thickness ($t_1$) of 2.4 mils, a density ($\rho_1$) of 7800 kg/m$^3$ and a specific heat capacity ($C_{p1}$) of 500 J/(kgK). The insulation layers 180 and 182 of the exemplary load beam 100 each have a thickness ($t_2$ and $t_3$) of 1 mil. The density ($\rho_2$ and $\rho_3$) and specific heat capacity ($C_{p2}$ and $C_{p3}$) is given for the particular material used to form the insulation layers 180 and 182. Table 1 also lists the time constant of the rigid layer 188 ($\tau_1$), the time constant of each of the thermal insulation layers 180 and 182 ($\tau_2$ and $\tau_3$), the effective specific heat capacity ($C_{peff}$) of the beam 100, the effective time constant of the beam 100 ($\tau_{eff}$) and the ratio of the effective time constant to the time constant of a beam formed solely from the rigid layer 188 ($\tau_{eff}/\tau_1$).

TABLE 1

| Insulation Material ($t_2 = t_3 = 1.0$ mil) | $\rho_2 = \rho_3$ (kg/m$^3$) | $\rho_{eff}$ (kg/m$^3$) | $C_{p2} = C_{p3}$ J/kgK | $C_{peff}$ J/kgK | $\tau_1$ (sec.) | $\tau_2 = \tau_3$ (sec.) | $\tau_{eff}$ (sec.) | $\tau_{eff}/\tau_1$ |
|---|---|---|---|---|---|---|---|---|
| Teflon ® | 2170 | 5241 | 1004 | 595 | 0.475 | 0.111 | 0.697 | 1.47 |
| Zirconium oxide (y2o3l2zr8) | 5500 | 6755 | 439 | 478 | 0.475 | 0.123 | 0.721 | 1.52 |
| Neoprene Rubber | 1250 | 4823 | 2176 | 697 | 0.475 | 0.138 | 0.752 | 1.58 |
| Chromium Nitride (CrN) | 6100 | 7027 | 699 | 578 | 0.475 | 0.217 | 0.909 | 1.91 |
| Cobalt nickel oxide (46coo.46nio.8lio) | 6500 | 7209 | 753 | 604 | 0.475 | 0.249 | 0.973 | 2.05 |

As shown in Table 1, the various exemplary insulation layers 180 and 182 increase the effective time constant of the exemplary suspension load beam 106 by 50 to 100 percent over that of the beam formed solely of the stainless steel rigid layer 188. As a result, the exemplary beam 100 will respond at least 1.5 times slower to changes in its thermal environment. In one embodiment, the insulation layer materials and thicknesses are selected to provide at least a 40 percent increase in the time constant.

Accordingly, the suspension load beam 100 of the present invention will have a lower time-varying deflection of a transducer head 113 supported at the front beam section 102 resulting in more accurate positioning of the head 113. Accordingly, the use of the suspension load beam 100 in an STW 160 or a disc drive 120 can improve its recording density capability. Additionally, the suspension load beam 100 of the present invention can also reduce thermally induced non-repeatable runout during track following operations.

Embodiments of the suspension load beam 100 include the use of the materials of Table 1 to form the insulation layers 180 and 182, as well as other suitable insulation materials. The important properties of the thermal insulation layers 180 and 182 that would increase the effective time constant and thus better isolate the beam 100 from environmental thermal fluctuations include high specific heat capacity, high density and large thickness. Embodiments of the suspension load beam 100 include the formation of the insulation layers using the same or different materials.

In one embodiment the rigid layer 188 is unitary and forms the main structure of the front beam section 102, the middle beam section 104 and the rear beam section 106. Alternatively, the rigid layer 188 forms at least one of the front beam section 102, the middle beam section 104 and the rear beam section 106. The rigid layer 188 can be formed of stainless steel, plastic or other suitable material. Alternatively, the rigid layer 188 can comprise a laminated structure.

Figure 6:
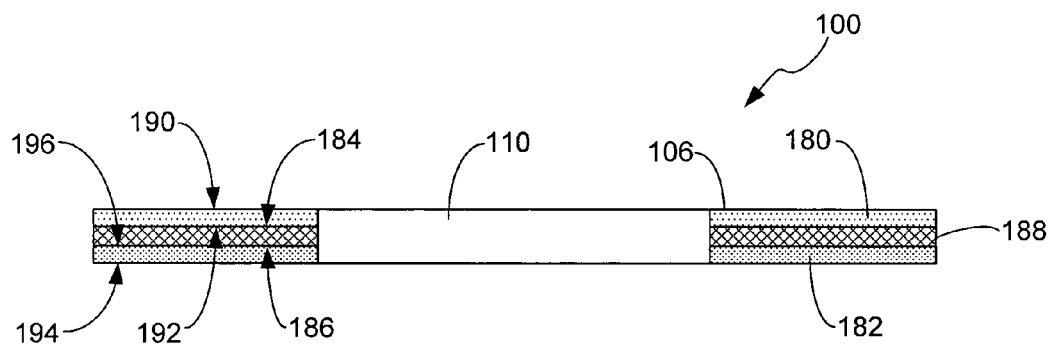
FIG. 6 is a cross-sectional view of a rear beam section of the suspension load beam of FIG. 1 taken generally along line 6-6.
Figure 7:
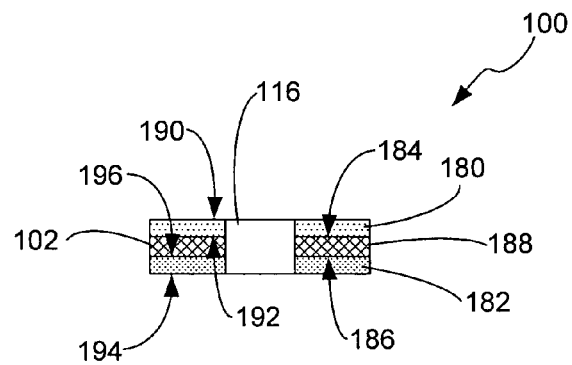
FIG. 7 is a cross-sectional view of a front beam section of the suspension load beam of FIG. 1 taken generally along line 7-7.

Embodiments of the suspension load beam 100 include the application of the insulation layers 180 and 182 to the front beam section 102 (FIG. 7), the middle beam section 104 (FIG. 5) and/or the rear beam section 106 (FIG. 6). In one embodiment, the thermal insulation layers 180 and 182 are applied uniformly over substantially the entire surfaces 184 and 186 of the rigid layer.

In another embodiment, the thermal insulation layers 180 and 182 are applied over select portions of the surfaces 184 and 186 of the rigid layer 188. Thus, where the rigid layer 188 is a unitary member that forms the front beam section 102, the middle beam section 104 and the rear beam section 106, the insulation layers 180 and 182 may be applied only to select portions of one or more of the various sections. Accordingly, embodiments of the load beam include the insulation layers 180 and 182 on select surfaces of the front beam section 102, the middle beam section 104 and/or the rear beam section 106.

The thicknesses of the insulation layers 180 and 182 can be the same or different. The thickness and choice of materials for the thermal insulation layers can be selected to best suit the desired application and provide the desired time constant increase. Embodiments of the insulation layers include thicknesses ($t_2$ and $t_3$) of greater than 0.3 mils. Other desirable properties of the thermal insulation layers include low thermal conductivity and good adhesion to the surfaces of the rigid layer.

Figure 8:
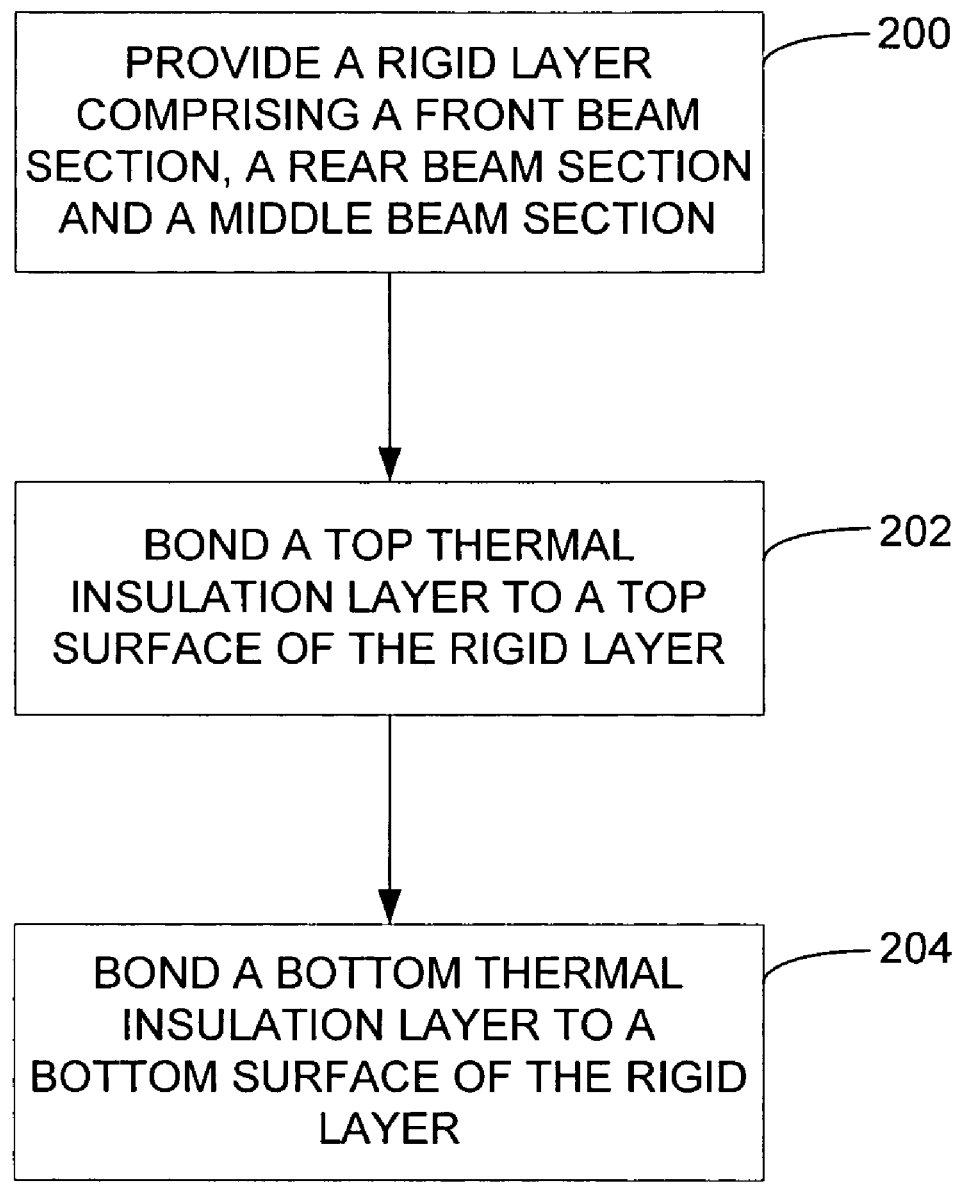
FIG. 8 is a flowchart illustrating a method of forming a suspension load beam in accordance with embodiments of the invention.

Additional embodiments of the invention include various methods for applying the thermal insulation layers 180 and 182 to the rigid layer 188. FIG. 8 is a flowchart of a such a method in accordance with embodiments of the invention. At step 200, the rigid layer 188 of the suspension load beam 100 is provided that includes a front beam section 102 for connecting to a slider assembly 112 carrying a transducer head 113, a rear beam section 106 for connecting to an actuation arm (134 or 174), and a middle beam section 104 located between the front beam section 102 and the rear beam section 106. Next, at step 202, the top thermal insulation layer 180 is applied to a top surface 184 of the rigid layer 188. Finally, at step 204, the bottom thermal insulation layer 182 is applied to a bottom surface 186 of the rigid layer 188. The bonding steps 202 and 204 can occur in any desired order or simultaneously.

The particular technique of bonding or applying the insulation layers 180 and 182 to the rigid layer 188 (steps 202 and 204) can depend on the material used to form the insulation layers. In one embodiment, a coating technique is used to bond or apply the insulative materials to the rigid layer 188 and form the insulation layers 180 and 182. Exemplary coating techniques include spray coating, plasma coating, and dip coating.

In another embodiment, the insulation layers 180 and 182 are applied or bonded to the rigid layer using a deposition technique, such as a physical vapor deposition or other deposition technique.

Surfaces of the rigid layer 188 on which the insulation layers are not desired can be masked off in accordance with conventional methods.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements used to form the suspension load beam may vary depending on the particular application for the suspension load beam while maintaining substantially the same functionality without departing from the scope and spirit of the present invention.

What is claimed is:

1. A suspension load beam comprising:
    a front beam section defining a mounting feature for connecting to a data transfer member at a distal end of the suspension load beam;
    a rear beam section defining another mounting feature for connecting to a support structure at a proximal end of the suspension load beam; and
    a middle beam section extending between and contiguous with both the front beam section and the rear beam section, wherein the middle beam section comprises a rigid layer sandwiched between opposing thermal insulation layers, wherein each thermal insulation layer has a first surface that contactingly engages a respective surface of the rigid layer throughout the entire middle beam section, and each thermal insulation layer has an opposing second surface that defines an exposed external surface of the suspension load beam covering the rigid layer surface throughout the entire middle beam section.

2. The suspension load beam of claim 1, wherein the front beam section is unitary with the rigid layer of the middle beam section.

3. The suspension load beam of claim 2, wherein the front beam section is sandwiched between the opposing thermal insulation layers.

4. The suspension load beam of claim 1, wherein the rear beam section is unitary with the rigid layer of the middle beam section.

5. The suspension load beam of claim 4, wherein the rear beam section is sandwiched between the opposing thermal insulation layers.

6. The suspension load beam of claim 1, wherein the rigid layer comprises a stainless steel sheet material.

7. The suspension load beam of claim 1, wherein a thermal time constant of the suspension load beam is substantially higher than a thermal time constant of just the rigid layer.

8. A method for fabricating a thermally insulated suspension load beam, the method comprising:
    obtaining a rigid layer comprising:
        a front beam section defining a mounting feature for connecting to a data transfer member at a distal end of the thermally insulated suspension load beam;

a rear beam section defining another mounting feature for connecting to a support structure at a proximal end of the thermally insulated suspension load beam; and a middle beam section extending between and contiguous to both the front beam section and the rear beam section;

bonding opposing thermal insulation layers to the rigid layer, wherein each thermal insulation layer has a first surface that contactingly engages a respective surface of the rigid layer throughout the entire middle beam section, and each thermal insulation layer has an opposing second surface that defines an exposed external surface of the suspension load beam covering the rigid layer surface throughout the entire middle beam section.

9. The method of claim 8, including setting a thickness of each of the opposing thermal insulation layers such that a thermal time constant of the suspension load beam is substantially higher than a thermal time constant of just the rigid layer.

\* \* \* \* \*